Patented Mar. 7, 1939

2,149,354

UNITED STATES PATENT OFFICE 2,149,354

METHOD OF TREATING MOLASSES AND RESULTING PRODUCT

George H. Lubarsky, New York, N. Y., assignor to Vitamol, Inc., New York, N. Y.

No Drawing. Application February 19, 1938, Serial No. 191,458

5 Claims. (Cl. 99—142)

This invention relates to the treatment of molasses and to the resulting product.

More particularly, the invention is directed to treating such molasses as contain, in addition to non-crystallizable sugars, various other organic substances such as caramel and certain organic gums. A typical example of this type of molasses is cane sugar molasses, sometimes known as blackstrap molasses. Usually such molasses has a density of 46° Bé. and is a thick and sticky liquid. Ordinarily it is used for various purposes, such as for human consumption, and largely for incorporation with stock food and the like. In most of its applications it is necessary to dilute the molasses with water as ordinarily it is too viscous and sticky to be conveniently worked in mixers or the like.

When molasses is mixed with water in ordinary mixing machines there is a coagulation of the gums which tend to settle to the bottom of the mass. Furthermore, there is generally formed on top of the molasses a layer of free water because molasses and water do not readily mix. At the borderline, that is, at the junction of the upper surface of the molasses and the lower surface of the water, there is a relatively thin layer of diluted molasses.

It is known that dilute molasses, say, that having a density of about 19° Bé. or less, is readily broken down by fermentation, and the ordinary molasses already contains yeasts and the like which cause fermentation. Therefore the diluted molasses in the intermediate layer begins to ferment with the formation of alcohol, lactic acid, and the like. This fermentation takes place upon standing for any material period of time and is accelerated during warm weather. The fermentation is not confined to the intermediate layer but spreads into the main body of the molasses, so that in time a very substantial proportion thereof may be converted. Not only is there a loss of sugars, but the fermentation causes undesirable properties to be introduced into the molasses, rendering it disadvantageous for consumption. The products of fermentation change the odor and flavor of the molasses often to such an extent that it cannot be used for food purposes.

Such diluted molasses is shipped to feed manufacturers, who mix the same in the proper proportion with various animal feeds. In the mixing process the presence of the gums, which tend to precipitate out of suspension and to coagulate, prevent a thorough and uniform impregnation of the feed with the molasses. They also tend to prevent complete absorption of the molasses by the feed so that as a result the molasses may be in excess in some parts of the feed and be deficient or lacking in other parts. Furthermore, said gums clog the mixing machine by reason of the stickiness of the product, causing not only a loss of power but a reduction in the efficiency of the mixing operation. Resulting therefrom, the feed may be lumpy and have a non-uniform distribution of molasses. This has the further disadvantage that after the feed mixture is completed and it is allowed to stand, the same will become caked in warm weather due to the action of said gums.

The present invention is intended and adapted to overcome the disadvantages inherent in prior methods and to produce a molasses composition which is not sticky, which is not subject to fermentation, which is homogeneous throughout, and which may be readily mixed with various substances, such as feeds, in a homogeneous manner producing a final product which is uniform, not lumpy, and not subject to caking.

In practicing my invention, I provide the ordinary black strap molasses having a density of about 46° Bé. and add thereto, or mix therewith, an amount of water equal to about 10%, which serves to reduce the density of the molasses after the operation is complete to about 43° Bé. The mixture is warmed to a substantial degree, usually to about 100° F. The purpose of the warming is in order to reduce the viscosity of the molasses and allow the same to flow more readily. It also facilitates the subsequent operation of incorporating the water with the molasses.

The mixture is then introduced into a homogenizer, or a colloid mill, and there subjected to a sufficiently vigorous agitation in order to dispense the water intimately to and with the molasses. I usually prefer to use a type of colloid mill wherein there is a container for the liquid to be homogenized and having in or near the bottom thereof a turbine operating at a very high speed. In the operation the mixture of molasses and water is rapidly drawn through the turbine and there subjected to the vigorous agitation, and the operation is repeated many times in a short period. It results not only in intimate contact of the water with the molasses, but above all it causes a breaking down mechanically of the gummy substances in the molasses which ordinarily tend to precipitate out upon the addition of water. These gums are broken into extremely small particles and are uniformly and substantially completely dispersed in the liquid.

It is possible that some of the gums actually go into solution, or that at least part thereof consist of small particles surrounded by solution and constituting the inner phase of an emulsion, and such particles remain permanently suspended in the liquid. By reason of the gums being in such condition, they lose the property of rendering the molasses sticky, and the resulting product may be readily and effectively used in the ordinary mixing machines in order to produce feeds or the like.

The product of the present invention is uniform throughout and has no tendency to settle into its constituents upon long standing or upon subjection to high temperatures. The resulting product is velvety and smooth and lends itself admirably to various operations. Whereas in the prior art it was attempted to overcome the difficulty of the molasses sticking to the apparatus used for mixing by heating the molasses and spraying the same through special machines onto the feed in order to obtain as uniform an impregnation of the feed as possible, the product of the present invention does not require the use of such special equipment but ordinary mixing devices may be effectively used.

Ordinary molasses does not mix readily with water, but the product of the present invention has been so changed by the above described treatment that additional water may be introduced into the same by a mere mixing operation. The water so added is uniformly dispersed throughout the mass and most likely forms a solution with the molasses.

I am aware that it has been proposed to render molasses non-sticky by a method in which the molasses was treated with a water solution of a jellifying agent and the molasses or the mixture was dehydrated to such an extent that the mixture had no greater moisture content than the untreated molasses. However, as a result of the treatment, the molasses became jellied and solid so that it was quite difficult, if not impossible, to adequately and uniformly mix the same with other materials, such as stock food.

Even if it did not assume a solid form, the fact that the amount of water was no greater than that in the original molasses would make it difficult, if not impossible, to mix with feeds. Being in a solid or semi-solid state, it would be still more difficult to add water to the product of said proposed process. The present invention differs, of course, very substantially from said prior art in that it is a process of dilution with a rendering of the molasses less sticky, more stable, not subject to fermentation, and being more readily utilizable for making desired mixtures.

Although I have described my invention setting forth a single embodiment thereof, it will be apparent to those skilled in the art that various changes in the details of the operation of my invention may be made without departing from the principles herein set forth. For example, although I have described the heating of the molasses mixture to about 100° F., it is not at all essential to heat, although heating aids in the subsequent operation. The temperature of the mixture may be raised to somewhat near the boiling point of water if desired with good results.

The initial material does not have to be of a density of 46° Bé. and varying amounts of water may be added thereto to reduce the density in varying degrees. The amounts of water stated in the specification are usual but not necessary amounts. One may add various steps to the operations described herein, as, for example, the molasses prior to treatment may be subjected to filtration through activated charcoal or the like in order to decolorize and purify the same, particularly if the product is to be used for human consumption.

Although I have described the use of the product of the present invention in animal feeds only, it is quite apparent that there are many other uses possible of my product. For example, it may be used directly for human consumption, it may be added to flavoring extracts, or vitamin compositions may be made therewith, or numerous other uses may be made thereof. In addition to the cane sugar molasses described above, other materials of a similar nature, that is, containing non-crystallizable sugars and organic gums, may be treated in accordance with the invention, as, for instance, beet sugar molasses, and in the claims I intend to include such starting materials.

These and other changes may be made in the details of my invention, the scope of which is to be broadly construed and to be limited only by the claims appended hereto.

What I claim is:

1. A composition of matter consisting essentially of cane sugar molasses of about 46° Bé. containing non-crystallizable sugars and organic gums rendering said molasses sticky, having dispersed therein about 10% of water, said gums being mechanically broken down into small particles and being dispersed in said composition and forming the inner phase of an emulsion, the molasses being dissolved in the water, and the composition being substantially less sticky than the original molasses.

2. A method of treating cane sugar molasses containing non-crystallizable sugars and organic gums which consists in mixing said molasses with an amount of water sufficient to bring the specific gravity of the mixture to about 43° Bé., vigorously agitating the same in a homogenizer to disperse the water into the molasses, and mechanically breaking down said gums into small particles which remain dispersed in the solution and which form the inner phase of an emulsion, whereby a uniform solution of molasses and water is obtained.

3. A method of treating cane sugar molasses containing non-crystallizable sugars and organic gums which consists in mixing said molasses with an amount of water sufficient to bring the specific gravity of the mixture to about 43° Bé., heating the mixture to a sufficient degree to reduce the viscosity of said molasses, vigorously agitating the same in a homogenizer to disperse the water into the molasses, and mechanically breaking down said gums into small particles which remain dispersed in the solution and which form the inner phase of an emulsion, whereby a uniform solution of molasses and water is obtained.

4. A composition of matter consisting essentially of cane sugar molasses containing non-crystallizable sugars and organic gums rendering said molasses sticky, having dispersed therein an amount of water sufficient to bring the specific gravity of the mixture to about 43° Bé., said gums having been mechanically broken down into small particles, the latter being dispersed in said composition and forming the inner phase of an emulsion, the molasses being dissolved in the water, and the composition being substantially less sticky than the original molasses.

5. A composition of matter consisting essentially of cane sugar molasses containing non-crystallizable sugars and organic gums rendering said molasses sticky, having dispersed therein an amount of water sufficient to bring the specific gravity of the mixture to about 43° Bé., said gums having been mechanically broken down into small particles, the latter being dispersed in said composition and forming the inner phase of an emulsion, the molasses being dissolved in the water, and the composition being substantially less sticky than the original molasses, said composition being substantially free from added alkaline metal compounds and salts thereof with constituents of said molasses.

GEORGE H. LUBARSKY.